(12) United States Patent
Campton et al.

(10) Patent No.: US 10,473,170 B2
(45) Date of Patent: Nov. 12, 2019

(54) CENTRIFUGALLY DISENGAGING MULTI-MODE CLUTCH MODULE

(71) Applicant: BorgWarner Inc., Auburn Hills, MI (US)

(72) Inventors: Calahan Campton, Royal Oak, MI (US); R. Keith Martin, Marlette, MI (US); John F. Guzdek, Clarkston, MI (US)

(73) Assignee: BorgWarner Inc., Auburn Hills, MI (US)

(*) Notice: Subject to any disclaimer, the term of this patent is extended or adjusted under 35 U.S.C. 154(b) by 207 days.

(21) Appl. No.: 15/566,493

(22) PCT Filed: Apr. 8, 2016

(86) PCT No.: PCT/US2016/026566
§ 371 (c)(1),
(2) Date: Oct. 13, 2017

(87) PCT Pub. No.: WO2016/168069
PCT Pub. Date: Oct. 20, 2016

(65) Prior Publication Data
US 2018/0298961 A1 Oct. 18, 2018

Related U.S. Application Data

(60) Provisional application No. 62/147,674, filed on Apr. 15, 2015.

(51) Int. Cl.
*F16D 43/16* (2006.01)
*F16D 41/16* (2006.01)
(Continued)

(52) U.S. Cl.
CPC ............. *F16D 43/16* (2013.01); *F16D 23/12* (2013.01); *F16D 41/16* (2013.01); *F16D 47/04* (2013.01);
(Continued)

(58) Field of Classification Search
CPC .......... F16D 43/16; F16D 47/04; F16D 23/12; F16D 41/16; F16D 2250/0084; F16D 2023/123; F16D 2043/145
See application file for complete search history.

(56) References Cited

U.S. PATENT DOCUMENTS

| 6,739,440 B1 | 5/2004 | Wesley |
| 7,699,746 B2 | 4/2010 | Maguire et al. |

(Continued)

FOREIGN PATENT DOCUMENTS

CN    101096982 A    1/2008

OTHER PUBLICATIONS

Chinese Office Action for Chinese Application No. 201680021980.0, dated Apr. 15, 2015.

(Continued)

*Primary Examiner* — David J Hlavka
(74) *Attorney, Agent, or Firm* — Miller, Matthias & Hull LLP

(57) ABSTRACT

An automatic transmission multi-mode clutch module (10, 100) may include either two concentric (30B, 30A) or two axially (130B, 130A) spaced sets of pawls (30B, 130B, 30A, 130A) nested between a pair of inner (20, 120) and outer races (12, 112). A first set of pawls (30B, 130B) is secured to the outer race (12, 112), and may be selectively released from a normally spring-biased default engagement with the inner race (20, 120) by an actuator cam ring (16, 116) rotatable between two angular limits. A second set of pawls (30A, 130A) is secured to the inner race (20, 120), and is (Continued)

released from a normally spring-biased default engagement with the outer race (12, 112) whenever the inner race (20, 120) reaches a threshold rotational speed, at which centrifugal forces acting on the inner set of pawls (30A, 130A) overcome the default spring bias to disengage the pawls (30A, 130A) from the outer race (12, 112). In either the concentric or the axial arrangement, the two sets of pawls (30B, 130B, 30A, 130A) are configured to secure two clutch module races (12, 112, 20, 120) together in either locked, one-way, or unlocked operating modes.

15 Claims, 5 Drawing Sheets

(51) Int. Cl.
    *F16D 23/12*     (2006.01)
    *F16D 47/04*     (2006.01)

(52) U.S. Cl.
    CPC .................. *F16D 2023/123* (2013.01); *F16D 2250/0084* (2013.01)

(56) References Cited

U.S. PATENT DOCUMENTS

| | | |
|---|---|---|
| 8,602,187 B2 | 12/2013 | Prout |
| 2008/0217131 A1 | 9/2008 | Wittkopp et al. |
| 2009/0005212 A1 | 1/2009 | Maguire et al. |
| 2010/0230226 A1 | 9/2010 | Prout |
| 2011/0269587 A1 | 11/2011 | Papania |

OTHER PUBLICATIONS

Chinese Office Action for Chinese Application No. 201680021980.0, dated Apr. 4, 2018.
International Search Report related to Application No. PCT/US2016/026566 dated Jul. 19, 2016.
International Search Report related to PCT Application No. PCT/US2016/026566 dated Jul. 19, 2016.

CENTRIFUGALLY DISENGAGING MULTI-MODE CLUTCH MODULE

CROSS-REFERENCE TO RELATED APPLICATION

This is a non-provisional patent application claiming priority under 35 USC § 119(e) to U.S. Provisional Patent Application Ser. No. 62/147,674 filed on Apr. 15, 2015.

FIELD OF DISCLOSURE

The present disclosure relates generally to overrunning clutches for automotive transmissions, and more particularly to multi-mode clutches employed in such transmissions.

BACKGROUND OF DISCLOSURE

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among variously available gear ratios without driver intervention. Pluralities of clutches, also called clutch modules, are incorporated within such transmissions to facilitate automatic gear ratio changes.

In an automatic transmission for an automobile, anywhere from three to ten forward gear ratios may he available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, unnecessary friction or parasitic drag is a constant issue; the drag arises from mechanical interactions of the various parts employed. Much effort has been directed to finding ways to reduce friction drag within automatic transmission components and systems.

By way of an example, one of the clutch modules of an automatic transmission associated with first (low) and reverse gear ratios may be normally situated at the front of the transmission and closely adjacent the engine crankshaft. The clutch may have an inner race and an outer race disposed circumferentially about the inner race. One of the races, for example the inner race, may be drivingly rotatable in only one direction. The inner race may be selectively locked to the outer race via an engagement mechanism such as, but not limited to, a roller, a sprag, or a pawl, as examples. In the one direction, the inner race may be effective to directly transfer rotational motion from the engine to the driveline.

Within the latter system, the outer race may be secured to an internal case or housing of an associated planetary member of the automatic transmission. Under such circumstances, in a first configuration the inner race may need to be adapted to drive in one rotational direction, but to freewheel in the opposite direction, in a condition referred to as overrunning. Those skilled in the art will appreciate that overrunning may be particularly desirable under certain operating states, as for example when a vehicle is traveling downhill. Under such circumstance, a driveline may occasionally have a tendency to rotate faster than an associated engine crankshaft. Providing for the inner race to overrun the outer race may avoid damage to the engine and/or transmission components.

In a second configuration, such as when a vehicle may be in reverse gear, the engagement mechanisms may be adapted for actively engaging in both rotational directions of the inner race, thus not allowing for an overrunning condition in a non-forward driving direction.

Above certain thresholds of rotational speed, need for interaction of the engagement mechanisms, particularly those associated with the first (low) and/or reverse gear ratios, may become unnecessary. Thus, rather than contributing to drag, for example at highway speeds, there may be substantial motivation to reduce and/or avoid interaction of the engagement mechanisms with any of the clutch parts, particularly those associated with the low/reverse clutch module.

SUMMARY OF DISCLOSURE

In accordance with one aspect of the disclosure, a multi-mode clutch module has a secured outer race, a rotary inner race concentrically disposed relative to the outer race, and a plurality of pawls positioned in two concentric rows disposed circumferentially between the inner and outer races. One row prevents relative rotation in one direction; the second row prevents relative rotation in an opposite direction.

In accordance with another aspect of the disclosure, one row of pawls is secured to the inner race; another row of pawls is secured to the outer race.

In accordance with another aspect of the disclosure, the multi-mode clutch module includes an actuator cam plate configured to engage the row of pawls secured to the outer race for selective release that row of pawls from their nominally spring biased engagement.

In accordance with yet another aspect of the disclosure, the row of pawls secured to the inner race is centrifugally released from normal spring biased engagement at a specific predetermined threshold speed.

In accordance with yet another aspect of the disclosure, the clutch module can provide separate locked, one-way, and freewheeling modes of the inner race relative to the outer race.

These and other aspects and features of the present disclosure may be better appreciated by reference to the following detailed description and accompanying drawings.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
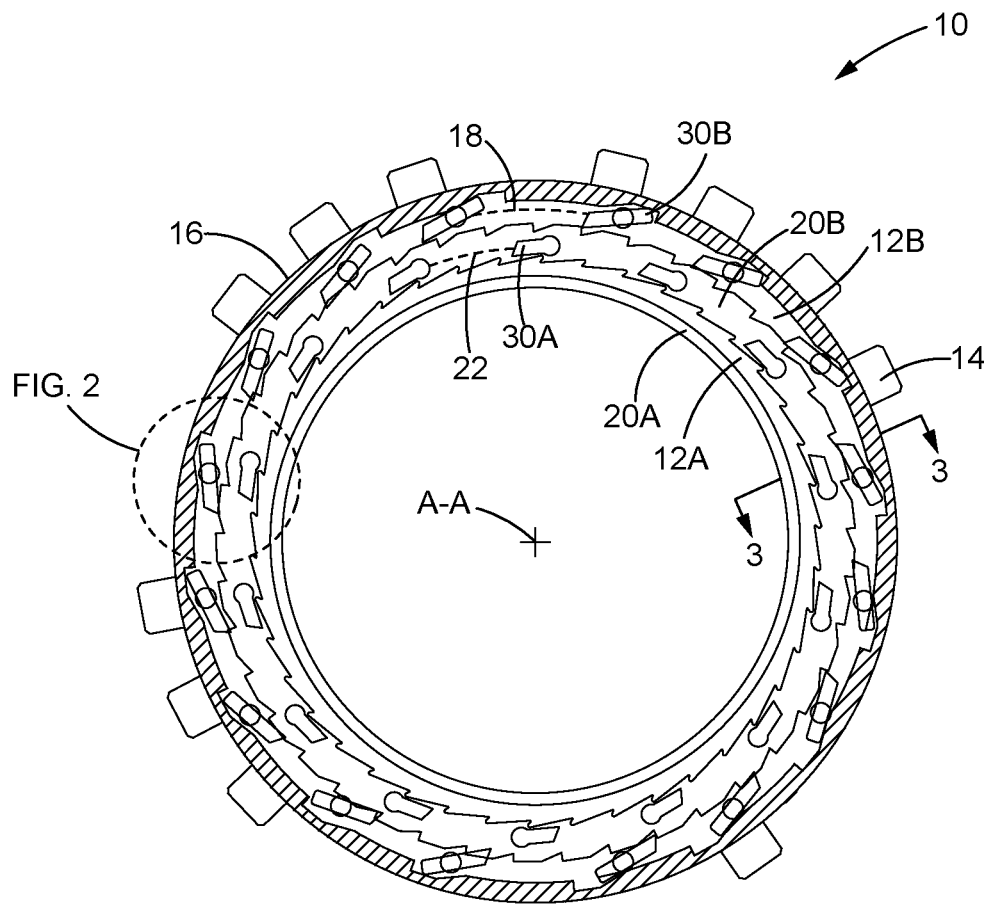
FIG. 1 is a side elevational view of a multi-mode clutch module constructed in accordance with the present disclosure, shown with portions removed to reveal certain details.

Referring initially to FIG. 1, a clutch module 10 has an axis A-A, and may be configured for use as a sub-unit of an automatic transmission (not shown). Such a transmission may be employed in a front-wheel driven automobile, for example. The clutch module 10 includes an outer race 12 (shown fragmentarily in FIG. 1 as interleaved or nested sub-parts 12A and 12B), an inner race 20 (also shown fragmentarily in FIG, 1 as nested sub-parts 20A and 20B), and two sets of concentrically arranged, spring-biased circumferential rows of pawls 30 (shown and described herein as 30A and 30B) situated between the races the controlling relative movement of the races. All races and pawls as described herein extend circumferentially about an axis A-A.

The outer race 12 has exterior splines 14, and is associated with an independently moveable cam ring 16 configured to move through a small arc for controlling a radially outermost row 18 of pawls 30B. Each of the pawls 30B, which may for example operate as reverse pawls, is secured to the outer race 12.

The inner race 20 of the clutch module 10 includes interior splines 28 (FIG. 3) for securement thereof to a transmission component 40 (FIG. 3), such as a carrier of a planetary gearset (neither shown). In this described embodiment only the inner race 20 is rotatable. The pawls 30A are arranged in a radially innermost circumferential row 22, concentrically positioned relative to the radially outermost row 18 of pawls 30B. The pawls 30A are secured to the inner race 20 for control by centrifugal forces as will be explained.

Figure 2:
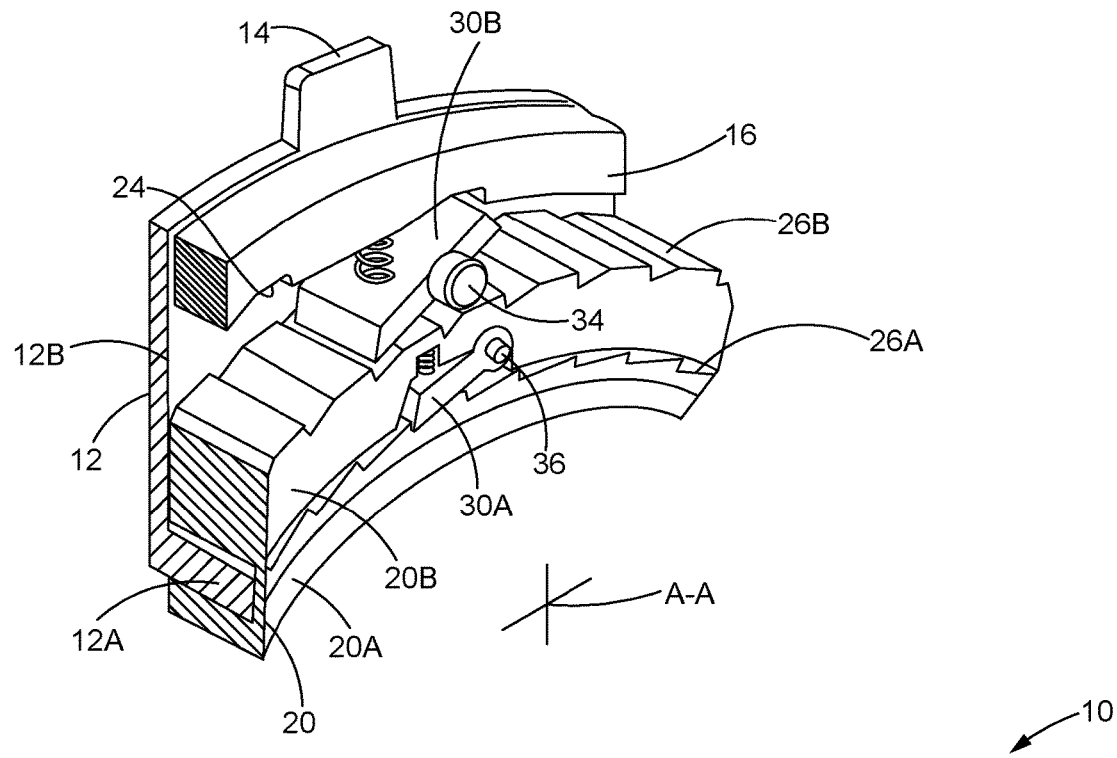
FIG. 2 is an enlarged perspective view of a circled portion of FIG. 1, the circled portion marked as FIG. 2.

Referring now to FIG. 2, an enlarged perspective view of an inset of FIG. 1 better reveals relationships among specific components. In this described embodiment, the cross-section of the outer race 12 is L-shaped, as shown, having an axially extending portion 12A, and a radially extending portion 12B. The inner race 20 has a C-shaped cross-section, and includes two axially extending portions 20A and 20B, between which is situated the portion 12A of the outer race 12. As earlier suggested, the outer race 12 may be described as being interleaved with the inner race 20 for achieving the functionality to be described.

The pawls 30A of the radially innermost circumferential row 22 (FIG. 1) are each secured to the inner race 20. The pawls 30A are normally spring biased into default engagement with the outer race 12 at the interleaved axially extending portion 12A. For this purpose, referring now also to FIG. 3, circumferentially extending cogs 26A are configured to accommodate engagement of the pawls 30A in the manner shown in FIG. 2. In this described embodiment, the inner race 20 rotates, while the outer race 12 remains stationary or secured. When the pawls 30A, which are supported on the inner race 20 for angular movements, reach a threshold speed, they are subjected to a predetermined amount of centrifugal force sufficient to overcome the spring bias. The pawls 30A then lift radially outwardly and hence out of engagement with the interleaved axially extending portion 12A of the outer race 12.

Figure 3:
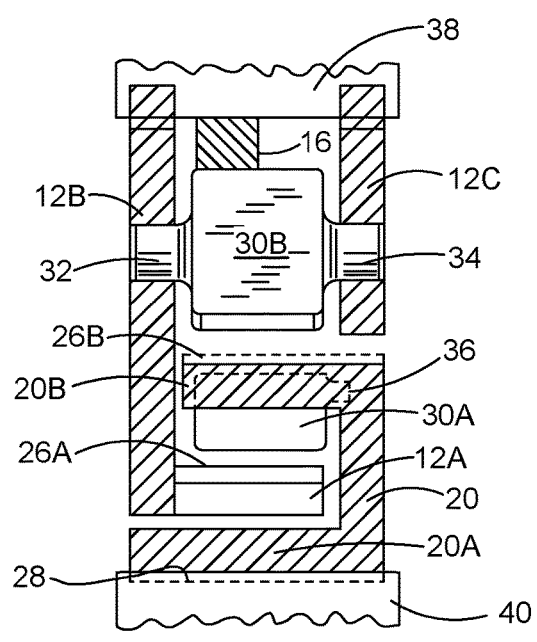
FIG. 3 is a cross-sectional view of the clutch module of FIG. 1, taken along lines 3-3 thereof.

Continuing reference now to both FIGS. 2 and 3, the radial portion 12B of the outer race 12 contains and supports the pawls 30B for their interaction with the axially extending portion 20B of the inner race 20. As were the pawls 30A, the pawls 30B are also spring biased to engagement in a default position. However, disengagement of the pawls 30B against the spring bias is achieved via the cam ring 16, which includes a pawl actuating profile 24, shaped to shift positions of the pawls 30B between their race-engaged and race-disengaged positions, as will be appreciated by those skilled in the art.

Continuing reference now specifically to FIG. 3, left and right pivot supports 32, 34, secured within radial portions 12B and 12C, respectively, retain the pawls 30B to the outer race 12 for limited pivotal movement between engagement and disengagement with the circumferentially extending sawtooth-shaped cogs 26B of the inner race 20. Only one pivot support 36 (shown fully in FIG. 2, but only in phantom in FIG. 3) is secured within the inner race 20 to support pivotal movement of the pawls 30A. In lieu of such a cantilevered-style support, the inner race 20 could employ an opposed radially extending portion or plate for additional support of the pawls 30A, similar to the radially extending portion 12 C of the outer race 12 used to support the pawls 30B.

Figure 4:
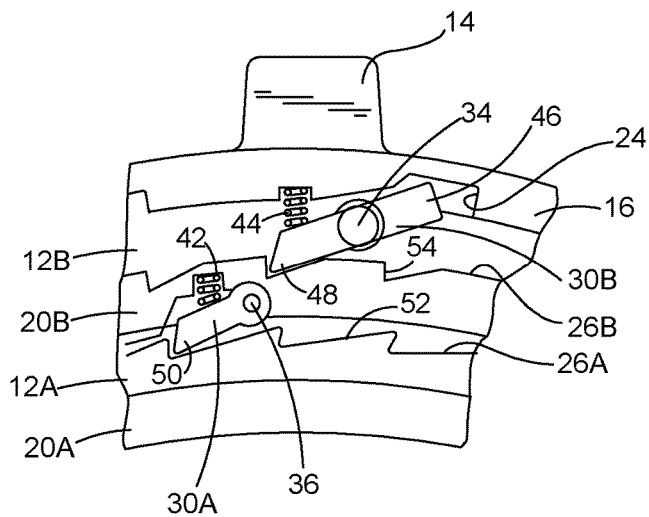
FIG. 4 is a side view of the portion of the clutch module shown in FIG. 2.

Referring now to FIG. 4 as has been noted the cam ring 16 is configured to be rotatably shifted over a small angle about the axis A-A between two circumferentially spaced positions. Thus, in FIG. 4, the cam ring 16 is shown in a left or first of its two positions, reflecting default engagements of the pawls 30B, under force of biasing springs 44 with individual notches 54 of the circumferentially extending cogs 26B. The springs 44 bear against the toes 48 of the pawls 30B to cause their engagement with the notches 54.

The cam ring 16 may be selectively rotated to overcome the spring bias, and thus to disengage the pawls 30B. For this purpose, the cam ring 16 includes a pawl actuating profile 24 configured to press against the heels 46 of pawls 30B, and thus to swivel the pawls 30B about their pivot supports 32, 34 (FIG. 3), and out of engagement or contact with the notches 54. In the first cam ring position of FIG. 4, the actuating profile 24 is not in contact with the heels 46 of the pawls 30B. Also in the mode of FIG. 4, the toes 50 of the pawls 30A of the inner race 12 are engaged with notches 52 of the circumferentially extending sawtooth-shaped cogs 26A of the outer race 12A, a condition that can occur only below a threshold speed. As such, in FIG. 4 the inner race 20 is rotationally locked to the outer race 12, and is hence in a "lock-lock" mode in which no overrunning will occur in either direction (clockwise or counterclockwise). To the extent that, as earlier noted the pawls 30B may act as a reverse pawls, this operative condition may be desirable as one of the selective modes of the clutch module 10.

Figure 5:
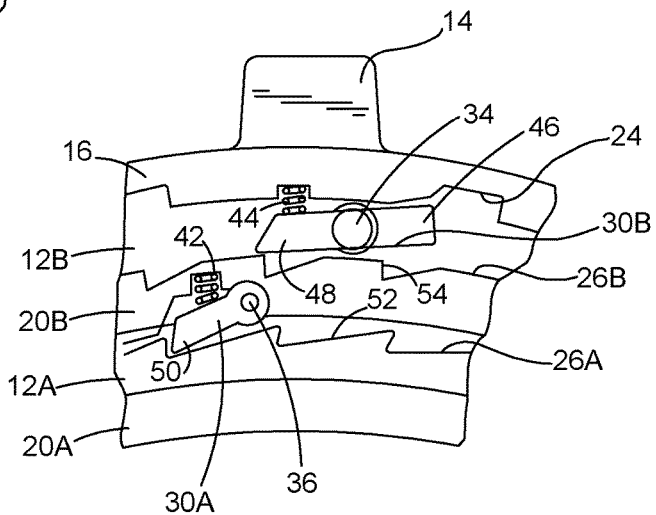
FIG. 5 is a side view similar to that of FIG. 4, but showing the clutch module in a different mode of operation.

Referring now to FIG. 5, with a small angular rotational shift of the cam ring 16 to the right, into its second position, the outer race (or reverse) pawls 30B are released from engagement. Thus, the biasing forces of springs 44 have been overcome, and the toes 48 of all of the reverse pawls 30B have become free from engagement with any of their respective notches 54, as compared to the lock-lock mode of FIG. 4 (in which the inner race 20 was locked in both clockwise and counterclockwise directions relative to the outer race 12). Depicting a one-way clutch mode, the configuration of FIG. 5 allows rotation, hence overrunning, of the inner race 20 in the clockwise direction, as the reverse pawls 30B have become disengaged from the inner race 20. The toes 50 of the inner race pawls 30A, which for example may operate as forward pawls, remain engaged with the notches 52 of the cogs 26B in the outer race ring portion 12A, a condition that will continue until a threshold speed of the inner race 20 is reached.

Figure 6:
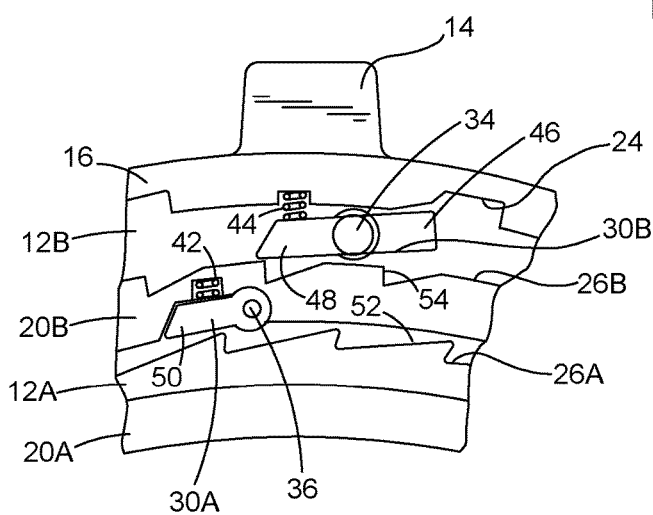
FIG. 6 is yet another side view similar to those of FIGS. 4 and 5, showing the clutch module yet another mode of operation.

Referring now to FIG. 6, with the cam ring 16 in the same position as in FIG. 5, it will now be appreciated that upon reaching the predetermined threshold speed, centrifugal forces will have lifted the toes 50 from notches 52, wherein the inner race 20 will be free to overrun in either direction; i.e. is free from any locking engagement of one race with the other. As depicted, in this freewheel mode in which overrunning is permitted in both directions, the reverse pawls 30B will remain disengaged from the inner race 20, and the inner race 20 will rotate in a clockwise, or forward, direction at a speed above the threshold speed at which a predetermined weighted mass of the toes 50 of the pawls 30A become subject to centrifugal forces sufficient to overcome the forces of springs 42. As such the forward pawls 30A will be positioned entirely out of engagement so as to avoid making any unnecessary contribution to parasitic friction drag forces.

As disclosed, the pawls 30 may be elongated hardened steel members circumferentially positioned about the axis A-A of the clutch module 10. Alternatively, the pawls maybe forgings or other manufactured structures, otherwise generally adapted to handle required loads of engagement as necessary for any particular clutch design. The pawls, 30A and 30B, arranged in sets of opposed concentric rows 18, 22, are thus configured to interact with both the inner race 20 and the outer race 12, in the embodiment and in the manner described.

Figure 7:
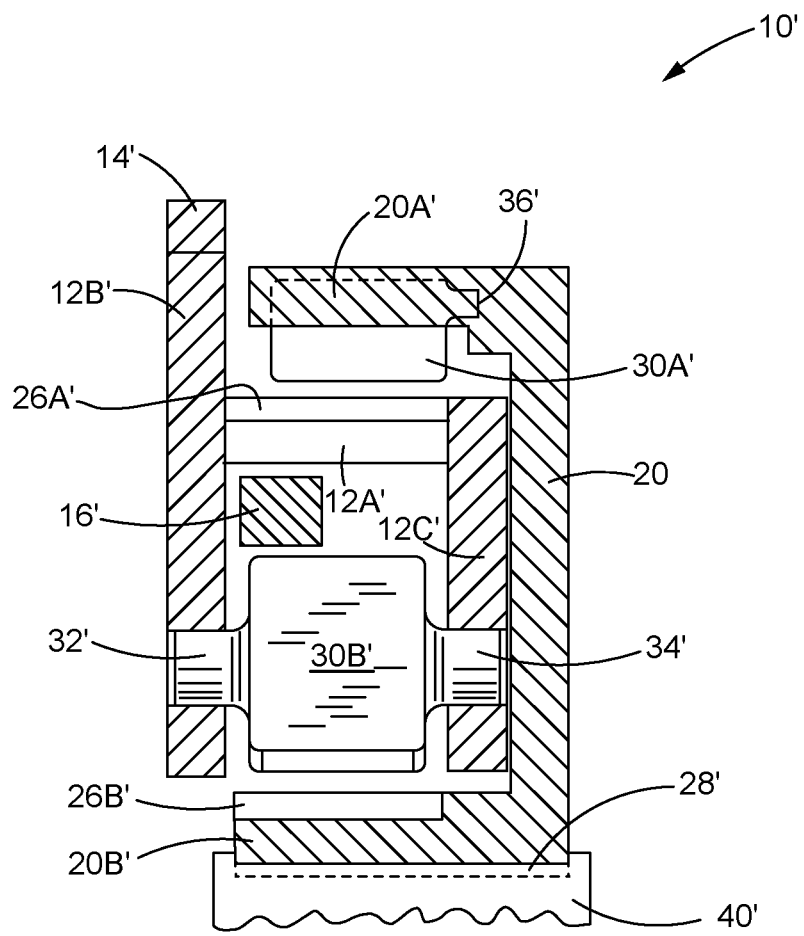
FIG. 7 is a cross-section of a portion of an alternate embodiment of the clutch module, constructed in accordance with the teachings of this disclosure.

Referring now to FIG. 7, an alternate embodiment of a multi-mode clutch module 10' is disclosed. In the alternate configuration, the previously described radial and axial portions of the outer race 12 (FIGS. 2-6) have counterpart portions 12A' and 12B' shaped in the form of a T, instead of the L-shaped structure previously described. In addition, it will be noted that the C-shaped inner race 20 is inverted, so that the axially extending portion 20A' is a radially outward portion instead of a radially inner portion 20A, as shown and described with respect to the previous embodiment. Thus, the previously described radially outer portion 20B constitutes a radially inner portion 20B' that engages the rotatable carrier 40' of a transmission planetary gearset (not shown) in the FIG. 7 embodiment.

Although the two described sets of reversely cooperating pawls 30A and 30B have been shown and described with respect to only a radially spaced orientation of rows 18 and 22, such rows could conceivably be axially spaced. Motivation for such an alternative approach may arise from under-the-hood and/or driveline/packaging considerations. The latter may dictate limitations on sizes, dimensions, and power envelopes, and thus determine whether a radial/circumferential arrangement may be ruled out in favor of an axial arrangement.

Figure 8:
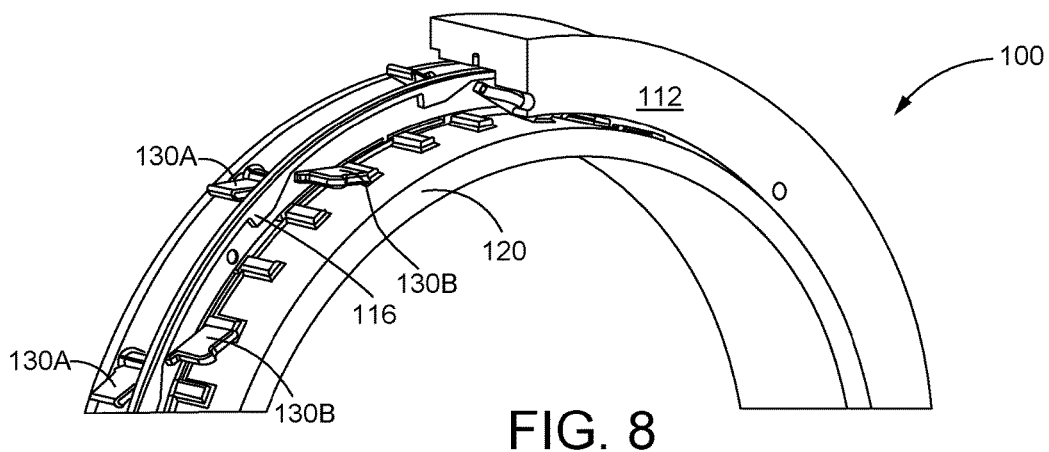
FIG. 8 is a perspective view of yet another embodiment of a multi-mode clutch module, constructed in accordance with the teachings of this disclosure.
Figure 9:
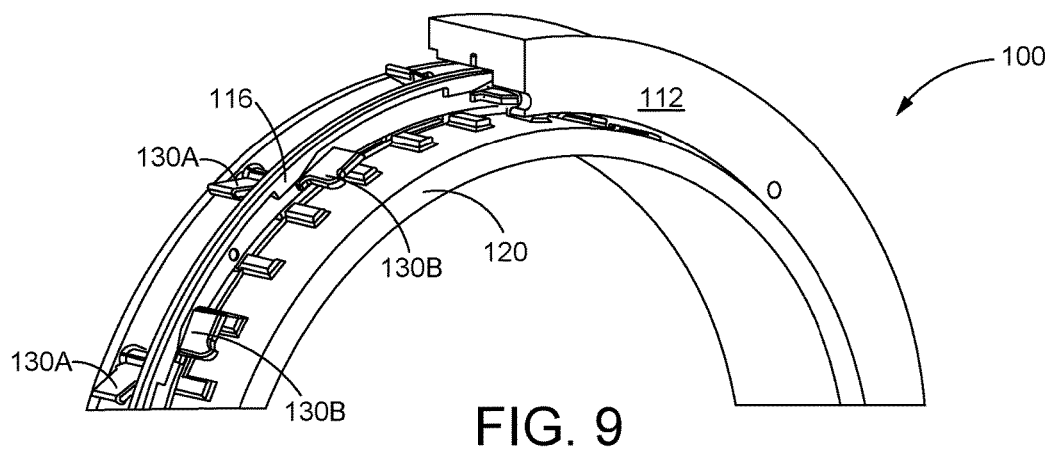
FIG. 9 is another perspective view of the clutch module of FIG. 8, showing the clutch module in a different mode of operation.
Figure 10:
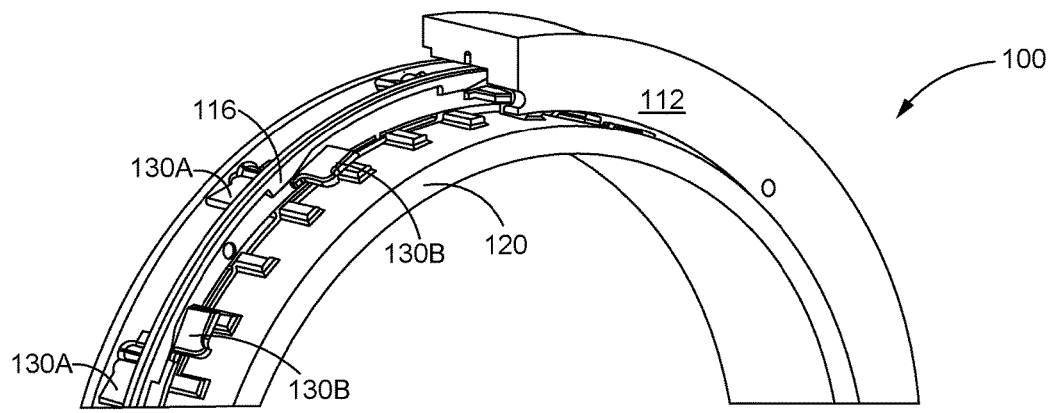
FIG. 10 is yet another perspective view of the clutch module of FIGS. 8 and 9, showing the clutch module in yet another mode of operation.

FIGS. 8, 9, and 10 depict an embodiment of an axially oriented clutch module 100. The orientations (i.e. clutch modes) of the clutch module 100 correspond to those of the clutch module 10, as depicted in FIGS. 4, 5, and 6. Referring first to FIG. 8, the clutch module 100 includes an outer race 112, a cam ring 116, and an inner race 120, similar to the described outer race 12, cam ring 16, and inner race 20, of the clutch module 10 (FIG. 4). Pluralities of axially arranged pawls 130A and 130B are thus analogous, and operate similarly, to the radially arranged pawls 30A and 30B, heretofore described.

As such, the pawls 130A are secured to the inner race 120, and are associated with a forward transmission mode of the clutch module 100. Moreover, the pawls 130A are configured to be centrifugally released upon reaching a threshold forward speed. Conversely, pawls 1309 are secured to the outer race 112 and are associated with a reverse transmission mode. As such, it will be appreciated that the pawls 130A are centrifugally disengaged, similar to the pawls 30A, while the pawls 130B are forced into disengagement against spring forces via the cam ring 116, similar to disengagement of pawls 30B via the cam ring 16. In FIG. 8, both sets of the pawls 130A, 130B are depicted in a lock-lock configuration, to effectuate a mode similar to the mode shown in FIG. 4.

Referring now to FIG. 9, the respective sets of pawls 130A, 130B are shown in a one-way clutch mode, wherein the forward pawls 130A are locked for forward movement, and the reverse pawls 130B are unlocked or disengaged. This mode configuration is similar to that shown for the clutch module 10 in FIG. 5.

Finally, referring to FIG. 10, both sets of pawls 130A, 130B are shown in unlocked or freewheeling states, thus reflecting a mode of the clutch module 100 that is analogous to the freewheeling mode of the clutch module 10 described in reference to FIG. 6.

Although several embodiments have been disclosed herein in detail, numerous additional embodiments are envisioned. For example, even though the concentric clutch module 10 of FIGS. 1-7 has an outer race 12 described as secured to the transmission case, and an inner race 20 rotatably moveable relative thereto, the clutch module 10 could be configured such that the inner race 20 could be secured. Similarly, even though the axially arranged clutch module 100 of FIGS. 8-10 has an outer race 112 described as being secured relative to the transmission case, the described moveable inner race 120 could alternatively be secured, and the outer race 112 movable, instead.

INDUSTRIAL APPLICABILITY

The clutch module of this disclosure may be employed in a variety of applications, including but not limited to, automobiles, trucks, off-road vehicles, and other machines of the type having engines, automatic transmissions, and drivelines.

The disclosed clutch module offers a unique approach to avoiding parasitic drag associated with pawls generally employed to engage inner and outer (or driving and driven) races of clutches in automatic transmissions. Each concentric row of pawls is situated between a secured outer race and a rotatable inner race, each row of pawls configured for selective engagement with notches for permitting limited angular motion. Alternatively, axially spaced rows, rather than concentric rows, of pawls may be similarly situated.

To the extent that one of the rows of pawls may be only centrifugally actuated from its default engagement, this approach provides for a relatively simple construction requiring only one actuator to achieve low parasitic drag at cruising speeds. As such, the forward pawls 30A and/or 130A may be configured to automatically disengage when not needed or required. The result is a reliable reduction of parasitic drag above speeds not requiring continued engagement or interaction of inner and outer race members in, for example, a first (low) and reverse clutch module of an automatic transmission.

What is claimed is:

1. A multi-mode clutch module (10), comprising:
a rotatable inner race (20) concentrically nested within a secured outer race (12) to support rotational movement of the inner race (20) relative to the outer race (12);
two concentric rows (18, 22) of race-engaging pawls (30) situated between the races (20, 12), a first row (18) of pawls (30B) secured to the outer race (12) to prevent rotation of the inner race (20) in one rotational direction, and a second row (22) of pawls (30A) secured to the inner race (20) to prevent rotation of the inner race (20) in an opposite rotational direction;
an actuator cam ring (16) rotatable between two angular limits and configured to selectively release the first row (18) of pawls (30B) secured to the outer race (12) from a normally spring-biased default engagement with the inner race (20);
the second row (22) of pawls (30A) secured to the inner race (20) and configured for a normally spring-biased default engagement with the outer race (12) until the inner race (20) reaches a threshold rotational speed;
wherein the second row (22) of pawls (30A) secured to the inner race (20) is configured to overcome spring-biased default engagement with the outer race (12) via centrifugal force, causing the second row (22) of pawls (30A) to he released from the outer race (12) for reduction of parasitic drag within the clutch module (10); and
wherein the first and second rows (18, 22) of pawls (30B, 30A) are configured to cooperatively secure the inner race (20) to the outer race (12) in locked, one-way, or unlocked operating modes.

2. The multi-mode clutch module (10) of claim 1, wherein the first row (18) of pawls (30B) is configured to enable a reverse mode of the clutch module (10).

3. The multi-mode clutch module (10) of claim 1, wherein the second row (22) of pawls (30A) is configured to enable a forward mode of the clutch module (10).

4. The multi-mode clutch module (10) of claim 1, wherein the first row (18) of pawls (30B) is actuated by the cam ring (16), and wherein each of the pawls of the first row (18) includes a heel (46) and a toe (48).

5. The multi-mode clutch module (10) of claim 1, wherein the second row (22) of pawls (30A) is centrifugally actuated, each pawl (30A) having only toes (50).

6. The multi-mode clutch module (10) of claim 5, wherein each of the toes (50) of the centrifugally actuated pawls (30A) are weighted, and configured to dislodge from the outer race (12) under centrifugal force at a predetermined threshold rotational speed of the inner race (20).

7. The multi-mode clutch module (10) of claim 1, wherein the inner race (20) comprises a driving race, and the outer race (12) comprises a driven race.

8. A multi-mode clutch module (100), comprising:
an inner race (120) rotatable relative to a secured outer race (112).

two axially spaced sets of race-engaging pawls (130B, 130A) situated between the races (112, 120), a first set of pawls (130B) secured to the outer race (112) to prevent rotation of the inner race (120) in one rotational direction, and a second set of pawls (130A) secured to the inner race (120) to prevent rotation of the inner race (120) in an opposite rotational direction;
an actuator cam ring (116) rotatable between two angular limits and configured to selectively release the first set of pawls (130B) from a normally spring-biased default engagement with the inner race (120);
the second set of pawls (130A) secured to the inner race (120) in a normally spring-biased default engagement with the outer race (112) until the inner race (120) reaches a threshold rotational speed;
wherein the second set of pawls (130A) secured to the inner race (120) is configured to overcome the spring-biased default engagement with the outer race (112) via centrifugal force, causing the second set of pawls (130A) to be released from the outer race (112) for reduction of parasitic drag within the clutch module (100); and
wherein the first and second sets of pawls (1309, 130A) are configured to cooperatively secure the inner race (120) to the outer race (112) in locked, one-way, or unlocked operating modes.

9. The multi-mode clutch module (100) will of claim 8, wherein the first set of pawls (130B) is configured to enable a reverse mode of the clutch module (100).

10. The multi-mode clutch module (100) of claim 8, wherein the second set of pawls (130A) is configured to enable a forward mode of the clutch module (100).

11. The multi-mode clutch module (100) of claim 8, wherein the first set of pawls (130B) are actuated by a cam ring (116), and each pawl (130B) includes a heel (46) and a toe (48).

12. The multi-mode clutch module (100) of claim 8, wherein the second set of pawls (130A) comprise centrifugally actuated pawls (130A), and each pawl (130A) has only a toe (50).

13. The multi-mode clutch module (100) of claim 12, wherein each of the toes (50) of the centrifugally actuated pawls (130A) are weighted, and configured to dislodge from the outer race (112) under centrifugal force at a predetermined threshold rotational speed of the inner race (120).

14. The multi-mode clutch module (100) of claim 8, wherein the inner race (120) comprises a driving race, and the outer race (112) comprises a driven race.

15. A method of making a multi-mode clutch module (100), the method including the steps of:
forming a secured outer race (112), and configuring an inner race (120) to be rotatable relative to the outer race (112);
placing two separate and spaced sets of race-engaging pawls (130B, 130A) between the inner and outer races (120, 112);
forming the first set of pawls (130B) to be secured to the outer race (112) to prevent rotation of the inner race (120) in one rotational direction, and a second set of pawls (130A) secured to the inner race (120) to prevent rotation of the inner race (120) in an opposite rotational direction;
configuring an actuator cam ring (116) to be rotatable between two angular limits for selective release of the first set of pawls (130B) secured to the outer race from a normally spring-biased default engagement with the inner race (120);

configuring the second set of pawls (130A) secured to the inner race (120) to have a normally spring-biased default engagement with the outer race (112) until the inner race (120) reaches a threshold rotational speed;

wherein the second set of pawls (130A) secured to the inner race (120) overcomes the normally spring-biased default engagement with the outer race (112) by centrifugal force, causing the second set of pawls (130A) to he released from the outer race (112) for reduction of parasitic drag within the clutch module (100); and wherein the first and second sets of pawls (130B, 130A) are configured to cooperatively secure the inner race (120) to the outer race (112) in locked, one-way, or unlocked operating modes.

* * * * *